United States Patent [19]

Groll et al.

[11] 4,277,245

[45] Jul. 7, 1981

[54] PROCESS FOR DYEING AND PRINTING CELLULOSE FIBRES

[75] Inventors: Manfred Groll, Cologne; Werner Kühnel, Leverkusen; Robert Kuth, Cologne, all of Fed. Rep. of Germany

[73] Assignee: Bayer Aktiengesellschaft, Leverkusen, Fed. Rep. of Germany

[21] Appl. No.: 123,866

[22] Filed: Feb. 22, 1980

[30] Foreign Application Priority Data

Mar. 8, 1979 [DE] Fed. Rep. of Germany ....... 2909012

[51] Int. Cl.$^3$ .............................. D06P 1/14; D06P 3/60
[52] U.S. Cl. ........................................... 8/532; 8/661; 8/918; 260/314.5
[58] Field of Search ........................... 8/661, 918, 532

[56] References Cited

U.S. PATENT DOCUMENTS

| | | | |
|---|---|---|---|
| 3,634,451 | 1/1972 | Groll et al. | 260/314.5 |
| 3,656,880 | 4/1972 | Blackwell | 8/21 C |
| 3,706,525 | 12/1972 | Blackwell et al. | 8/21 C |
| 3,711,245 | 1/1973 | Neumer | 8/21 C |
| 4,049,377 | 9/1977 | Schwab et al. | 8/21 C |

*Primary Examiner*—A. Lionel Clingman

*Attorney, Agent, or Firm*—Sprung, Felfe, Horn, Lynch & Kramer

[57] ABSTRACT

In order to dye and print cellulose fibres swollen with water-miscible swelling agents or fibre blends containing these fibres, the fibres are treated with a dyestuff of the general formula

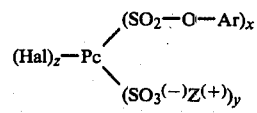

wherein
  Pc denotes the radical of a Cu phthalocyanine, Ni phthalocyanine or Co phthalocyanine molecule,
  Ar denotes aryl,
  $Z^{(+)}$ denotes a hydrogen ion, an alkali metal ion or an ammonium ion,
  Hal denotes chlorine or bromine,
  x denotes a number from 2 to 4,
  y denotes 0 or 1 and
  $x+y \leq 4$, and
  z denotes a number from 0 to 4,
and the dyestuff is fixed by heat treatment.

3 Claims, No Drawings

PROCESS FOR DYEING AND PRINTING CELLULOSE FIBRES

The invention relates to a process for dyeing and printing cellulose fibres swollen with water-miscible swelling agents, or fibre blends containing these fibres.

The process is characterised in that the fibres are treated with a dyestuff of the general formula

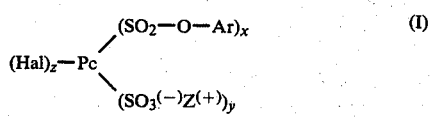

wherein

Pc denotes the radical of a Cu phthalocyanine, Ni phthalocyanine or Co phthalocyanine molecule,
Ar denotes aryl,
$Z^{(+)}$ denotes a hydrogen ion, an alkali metal ion or an ammonium ion,
Hal denotes chlorine or bromine,
x denotes a number from 2 to 4,
y denotes 0 or 1 and
$x+y \leq 4$, and
z denotes a number from 0 to 4,
and the dyestuff is fixed by heat treatment.

The invention also relates to dyestuff formulations which contain a dyestuff of the formula (I) and are used for dyeing and printing cellulose and cellulose-containing fibre material.

The dyestuffs of the formula (I) are sparingly soluble to insoluble in water in the neutral pH range.

Dyestuffs of the formula (I) wherein
Pc represents the radical of Cu phthalocyanine or Ni phthalocyanine, are preferred.

At the most 1 sulphonic acid group is attached to the Pc radical.

Examples of ammonium ions which may be mentioned are $NH_4$ and mono-, di-, tri- or tetra-$C_1$-$C_4$-alkyl ammonium, in which the alkyl radicals can be substituted by OH.

The aryl radical given in formula (I) is, in particular, an optionally substituted phenyl or naphthyl radical. The two radicals can carry 1, 2 or 3 other substituents. Examples of suitable substituents are: halogen, $C_1$-$C_{12}$-alkyl or $C_1$-$C_4$-alkoxy, which can be substituted by halogen, hydroxyl or $C_1$-$C_4$-alkoxy, nitro, acetyl, propionyl, benzoyl, carboxylic acid $C_1$-$C_8$-alkyl ester, carboxylic acid phenyl ester, carboxylic acid benzyl ester, $C_1$-$C_4$-alkylmercapto, $C_1$-$C_4$-alkylsulphinyl, $C_1$-$C_4$-alkylsulphonyl, amino-carbonyl or -sulphonyl, mono- or di-alkylamino-carbonyl or -sulphonyl with a total of 1-4 carbon atoms, urea, cyclohexyl, or phenyl, which can in turn be substituted by the abovementioned radicals. Halogen is understood as fluorine, chlorine or bromine.

Substituted phenyl radicals which may be mentioned are: 2-chlorophenyl, 3-chlorophenyl, 4-chlorophenyl, 2,4-dichlorophenyl, 4-bromophenyl, 3-nitrophenyl, 2-chloro-4-nitrophenyl, 2-methylphenyl, 3-methylphenyl, 4-methylphenyl, 3-methyl-4-chlorophenyl, 2-ethylphenyl, 3,4-dimethylphenyl, 3,4-dimethylphenyl, 3-ethyl-5-methylphenyl, 2,3,5-trimethylphenyl, 2-isopropylphenyl, 2-tert.-butylphenyl, 4-tert.-butylphenyl, 2,6-diisopropylphenyl, 2,6-di-tert,-butylphenyl, 4-isooctylphenyl, dodecylphenyl (mixed branching), 3-methoxyphenyl, 4-methoxyphenyl, 3-ethoxyphenyl, 3-biphenyl, 4-biphenyl, 4-acetylphenyl, 2-acetylphenyl, 3-methoxycarbonyl-phenyl, 4-methoxycarbonyl-phenyl, 3-cyanophenyl and 4-cyclohexylphenyl.

Preferred dyestuffs of the formula (I) are furthermore those in which Ar represents a phenyl radical which is substituted by one or more alkyl radicals with 2 to 12 carbon atoms.

The dyestuffs of the formula (I) are obtained in the customary manner by reacting phthalocyanine-sulphonic acid chlorides of the formula

with at least x mols of a phenol of the formula

with the addition of an acid-binding agent, preferably at temperatures of 0° C. to 70° C., it being possible to carry out the reaction in water, an organic solvent or a mixture of water and a water-miscible organic solvent.

Depending on the procedure, hydrolysis of $SO_2Cl$ groups takes place to a slight extent as a side reaction of this reaction. However, on average less than 1.0 sulphonic acid groups are thereby formed per phthalocyanine molecule.

The phthalocyaninesulphonic acid chlorides of the formula (II) are prepared in a known manner by treating phthalocyanines or phthalocyaninesulphonic acids with chlorosulphonic acid, or chlorosulphonic acid and thionyl chloride or phosphorus pentachloride. Some of the dyestuffs of the formula (I) and their preparation are known from U.S. Pat. No. 3,634,451.

The dyestuffs to be used according to the invention, which are scarcely soluble in water, differ from phthalocyanine pigments in that, because of their sulphonic acid aryl ester group, they have a certain solubility in organic media such as dimethylformamide, 1,2-dichlorobenzene, nitrobenzene, toluene, chloroform or ethyl acetate.

It has now been found that the dyestuffs of the formula (I), which are free from fibre-reactive groups, are outstandingly suitable for dyeing and printing cellulose fibres which can be swelled in water and fibre blends containing these fibres, when they are applied by the process known from German Auslegeschrift No. 1,811,796. In this process, the fibres are brought into contact with an amount of water sufficient to swell the cellulose and with a water-miscible swelling agent before or during the treatment with a dyestuff. The swelling agent must be able to maintain the swelling of the cellulose when the water is removed and to dissolve the dyestuff at the dyeing temperature, if necessary with the aid of an additional solubilising agent. The swelling agent is generally added in an amount of 10 to 30% by weight, relative to the cellulose fibres. Suitable swelling agents have a boiling point above 150° C.

The dyestuff and swelling agent can be applied simultaneously to the fibre, or the fibre can first be treated with the swelling agent and then with the aqueous dyestuff dispersion.

Finally, the dyestuff is fixed by heat treatment, in particular at 150°-230° C.

The process is suitable for dyeing and printing both natural cellulose and regenerated cellulose.

The process is particularly of interest for dyeing and printing fibre blends of cellulose and synthetic fibres, such as polyamide fibres and polyester fibres, especially cotton/polyester fibre blends, since solid dyeing or solid printing can thereby be achieved in a one-stage procedure.

Processes of this type and other auxiliaries which can be used instead of the products known from German Auslegeschrift 1,811,796 are disclosed, for example, in German Offenlegungsschriften 2,524,243, 2,528,743, 2,636,427, 2,643,804 and 2,751,830.

The dyestuffs (I) give dyeings and prints with colour shades between turquoise blue and green which match well on the fibre blends. They are distinguished by very good fastness properties, and in addition to fastness to washing, fastness to sublimation, light and drycleaning should be emphasised in particular.

In addition to water, the dyestuff formulations according to the invention can contain customary constituents such as dispersing agents, for example non-ionic and/or anionic and/or cationic dispersing agents, thickeners and/or the abovementioned dyestuff solvents.

The parts mentioned in the examples below are parts by weight and the temperatures are in ° C.

EXAMPLE 1

(a) 200–300 Parts of the dyestuff of the formula

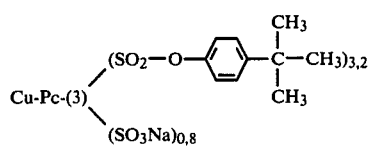

are mixed with 60 to 90 parts of a non-ionic dispersing agent (Emulsifier U), the mixture is made up to 1000 parts with water and dispersion is effected in a ball mill or in another suitable apparatus. In order to prevent the dyestuff paste from drying too rapidly, a little preservative and glycols or glycerol can also be added.

(b) A PES/CO 50:50 fabric is printed with a printing paste consisting of

| |
|---|
| 1–50 parts of the dyestuff paste from paragraph (a) |
| 100 parts of polyethylene glycol (molecular weight: about 400) |
| 399–350 parts of water and |
| 500 parts of a 10% strength guar flour thickener |
| 1000 parts | using a rotary screen printing machine or screen printing tables. (If a roller printing machine is used, the amount of polyethylene glycol must be increased to 150–200 parts, depending on the depth of the gravure cells.)

The fabric is then dried, the dyestuff is fixed with dry heat at 210° for 1 minute and the fabric is rinsed, soaped, rinsed again and dried.

A turquoise blue print which is fast to washing is obtained.

(c) The dyestuff used under (a) and (b) is prepared as follows:

48 g of 4-tert.-butylphenol are dissolved in 750 g of water with the aid of 12.8 g of sodium hydroxide. 97 g of copper phthalocyanine-3-tetrasulphonic acid chloride in the form of an aqueous paste are stirred into the solution, which has been cooled to 10° C. The temperature is increased to 65° C. in the course of 6 hours and the suspension is stirred at this temperature until the reaction has ended, the pH value being kept at not less than 9.5 by adding a little sodium hydroxide solution. The solid is filtered off, washed with water and dried. 130 g of a blue powder of the formula

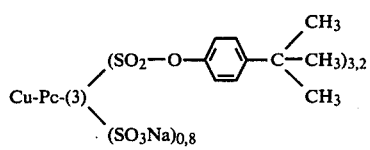

are obtained.

The dyestuff obtained is insoluble in water. However, it dissolves readily in chloroform.

EXAMPLES 2–21

The procedure followed is as described in Example 1, but the dyestuffs of the formula

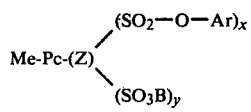

described in the Table below are used. Prints which are fast to washing and have the colour shades indicated in the Table are obtained.

| Example | Me | Z | B | —Ar | x | y | Colour shade |
|---|---|---|---|---|---|---|---|
| 2 | Cu | 3 | Na | ─⟨◯⟩─C(CH$_3$)─CH$_2$─C(CH$_3$)$_2$─CH$_3$ | 3.6 | 0.4 | turquoise blue |
| 3 | Cu | 3 | Na | ─⟨◯⟩─C$_{12}$H$_{25}$ | 3.6 | 0.4 | turquoise blue |
| 4 | Ni | 3 | K | ─⟨◯⟩─C(CH$_3$)$_2$─CH$_3$ | 3.5 | 0.5 | bluish-tinged green |
| 5 | Ni | 3 | Na | ─⟨◯⟩─C(CH$_3$)─CH$_2$─C(CH$_3$)$_2$─CH$_3$ | 3.5 | 0.5 | bluish-tinged green |
| 6 | Ni | 3 | Na | ─⟨◯⟩─C$_{12}$H$_{25}$ | 3.5 | 0.5 | bluish-tinged green |

-continued

| Example | Me | Z | B | —Ar | x | y | Colour shade |
|---|---|---|---|---|---|---|---|
| 7 | Cu | 4 | Na | —C6H4—C(CH3)3 | 3.2 | 0.8 | turquoise blue |
| 8 | Cu | 3 | Na | —C6H3(Cl)—Cl | 3.5 | 0.5 | turquoise blue |
| 9 | Cu | 3 | Na | —C6H4—CO—CH3 | 3.4 | 0.6 | turquoise blue |
| 10 | Cu | 3 | Na | —C6H4—C(O)—O—CH2—CH(C2H5)(C4H4) | 3.8 | 0.2 | turquoise blue |
| 11 | Cu | 3 | Na | —C6H4—C(O)—OCH3 | 3.2 | 0.8 | turquoise blue |
| 12 | Cu | 3 | Na | —C6H5 | 3.1 | 0.9 | turquoise blue |
| 13 | Cu | 3 | Na | —C6H3(CH3)(C2H5) | 3.8 | 0.2 | turquoise blue |
| 14 | Cu | 3 | Na | —C6H3(CH3)—CH3 | 3.4 | 0.6 | turquoise blue |
| 15 | Cu | 3 | Na | CH3—C6H3—CH3 | 3.5 | 0.5 | turquoise blue |
| 16 | Ni | 3 | Na | —C6H3(CH3)(C2H5) | 3.6 | 0.4 | bluish-tinged green |
| 17 | Cu | 4 | Na | —C6H3(CH3)(C2H5) | 3.4 | 0.6 | turquoise blue |
| 18 | Cu | 3 | Na | —C6H4—C(CH3)2—CH2—C(CH3)3 | 3.0 | 0.1 | turquoise blue |
| 19 | Cu | 3 | K | —C6H4—C(CH3)3 | 2.8 | 0.3 | turquoise blue |
| 20 | Cu | 3 | Na | —C6H4—C12H5 | 2.8 | 0.3 | turquoise blue |
| 21 | Ni | 3 | Na | —C6H4—C(CH3)2—CH2—C(CH3)3 | 2.8 | 0.3 | bluish-tinged green |

EXAMPLE 22

(a) 200–300 Parts of the dyestuff of the formula

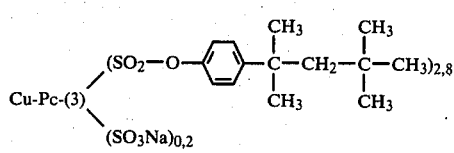

are mixed with 60 to 90 parts of a non-ionic dispersing agent (Emulsifier U), the mixture is made up to 1000 parts with water and dispersion is effected in a ball mill or in another suitable apparatus. In order to prevent the dyestuff paste from drying too rapidly, a little preservative and glycols or glycerol can also be added.

(b) A PES/CO 65:35 fabric is printed with a printing paste consisting of

| |
|---|
| 1–50 parts of the dyestuff paste from paragraph (a) |
| 100 parts of the boric acid ester of polyethylene glycol (molecular weight: 300) |
| 399–350 parts of water and |
| 500 parts of a 4% strength alginate thickener |
| 1000 parts | using a rotary screen printing machine or screen printing tables.

The fabric is then dried, the dyestuff is fixed with dry heat at 210° C. for 1 minute and the fabric is rinsed, soaped, rinsed again and dried. A turquoise blue print which is fast to washing is obtained.

(c) The dyestuff used under (a) and (b) is prepared as follows:

93 g of 4-iso-octylphenol are dissolved in 500 g of diethylene glycol monomethyl ether with the aid of 17 g of sodium hydroxide. 87 g of copper phthalocyanine-3-trisulphonic acid chloride in the form of a water-moist paste are added at 15°–20° C. The temperature is increased to 65° C. in the course of 6 hours and the mixture is stirred at this temperature until the reaction has ended. It is then cooled to 20° C. and filtered and the material on the filter is washed first with a mixture of diglycol monomethyl ether and water and then with water. After drying, 134 g of a blue powder of the formula

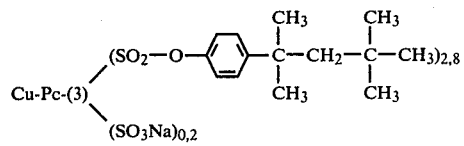

are obtained.

The dyestuff obtained is insoluble in water but has a good solubility in chloroform.

EXAMPLE 23

(a) 200–300 Parts of the dyestuff of the formula

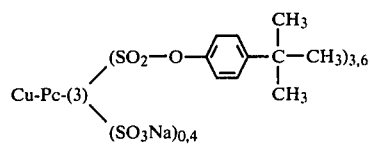

are mixed with 60 to 90 parts of a non-ionic dispersing agent (Emulsifier U), the mixture is made up to 1000 parts with water and dispersion is effected in a ball mill or with another suitable apparatus. In order to prevent the dyestuff paste from drying too rapidly, a little preservative and glycols or glycerol can also be added.

(b) A PES/CO 50:50 fabric is padded with a 10% strength solution of polyethylene glycol (molecular weight: 400) with a pick-up of 100% and is then printed with a paste consisting of

| |
|---|
| 1–150 parts of the dyestuff paste from paragraph (a) |
| 50 parts of a thickener concentrate which essentially consists of polyacrylic acid broken down under alkaline conditions |
| 949–800 parts of water |
| 1000 parts |

Thereafter, the fabric is dried and the dyestuff is then fixed in high temperature steam at 175° C. for 6 hours. The fabric is now rinsed, soaped, rinsed again and dried. A turquoise blue print which is fast to washing is obtained.

The dyestuff used under (a) and (b) is prepared as follows:

63 g of 4-tert.-butylphenol are dissolved in 750 g of water with the aid of 16.8 g of sodium hydroxide. 97 g of copper phthalocyanine-3-tetrasulphonic acid chloride in the form of an aqueous paste are stirred into the solution, which has been cooled to 10° C. The temperature is increased to 65° C. in the course of 6 hours and the mixture is stirred at this temperature until the reaction has ended. The suspension is cooled to 20° C. and filtered. The material on the filter is washed first with water, then with methanol and finally again with water. After drying, 132 g of a blue powder of the formula

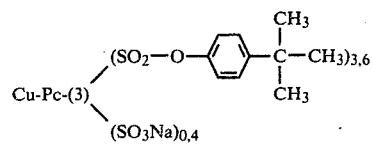

are obtained.

The dyestuff obtained is insoluble in water. It dissolves in chloroform giving a turquoise blue-coloured solution.

We claim:

1. In the dyeing and printing of cellulose fibers alone or admixed with other fibers by swelling said fibers with a water-miscible swelling agent, treating the swollen fibers with a dyestuff, and fixing the dyestuff by heat treatment, the improvement which comprises employing as said dyestuff a compound of the formula

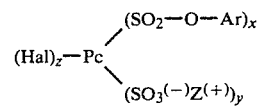

wherein
Pc is the radical of a Cu phthalocyanine, Ni phthalocyanine or Co phthalocyanine molecule,
Ar is a phenyl or naphthyl radical which can be substituted by halogen, $C_1$–$C_{12}$-alkyl or $C_1$–$C_4$-alkoxy, which can in turn be further substituted by halogen, hydroxyl or $C_1$–$C_4$-alkoxy, nitro, acetyl, propionyl, benzoyl, carboxylic acid $C_1$–$C_8$-alkyl ester, carboxylic acid phenyl ester, carboxylic acid benzyl ester, $C_1$–$C_4$-alkylmercapto, $C_1$–$C_4$-alkylsulphinyl, $C_1$–$C_4$-alkylsulphonyl, amino-carbonyl or -sulphonyl, mono- or di-alkylamino-carbonyl or -sulphonyl with a total of 1–4 carbon atoms, urea, cyclohexyl or phenyl, it being possible for the last 3 substituents to be in turn substituted by the above-mentioned radicals, $Z^{(+)}$ is a hydrogen ion, an alkali metal ion or an ammonium ion, Hal is chlorine or bromine, x is 2, 3 or 4, y is 0 or 1, $x+y \leq 4$, and z is 0, 1, 2, 3 or 4.

2. A process according to claim 1, wherein A is phenyl substituted by alkyl of 2 to 12 carbon atoms.

3. A process according to claim 1, wherein Pc is the radical of a Cu or Ni phthalocyanine and $x+y=3$ or 4.

* * * * *